Dec. 12, 1961 D. H. CHANDLER 3,013,216

AMPLITUDE LIMITED AMPLIFIERS

Filed March 10, 1959

INVENTOR:
David Horace Chandler
BY:
Baldwin & Wight
his ATTORNEYS

United States Patent Office 3,013,216

Patented Dec. 12, 1961

3,013,216

AMPLITUDE LIMITED AMPLIFIERS

David Horace Chandler, East Hanningfield, England, assignor to Marconi's Wireless Telegraph Company Limited, London, England, a British company Filed Mar. 10, 1959, Ser. No. 798,514

Claims priority, application Great Britain Mar. 27, 1958

2 Claims. (Cl. 330—95)

This invention relates to amplitude limited amplifier.

The main object of the present invention is to provide improved amplitude limited amplifiers capable of effecting with high gain and high linearity the D.C. amplification of a desired small amplitude portion of a large amplitude input signal without being paralyzed by those parts of the input signal beyond the range of the small portion required to be examined. Amplifiers capable of doing this are often required for a variety of different purposes, notably in connection with the examination in detail of a small portion of a large amplitude input wave form.

Figure 1:
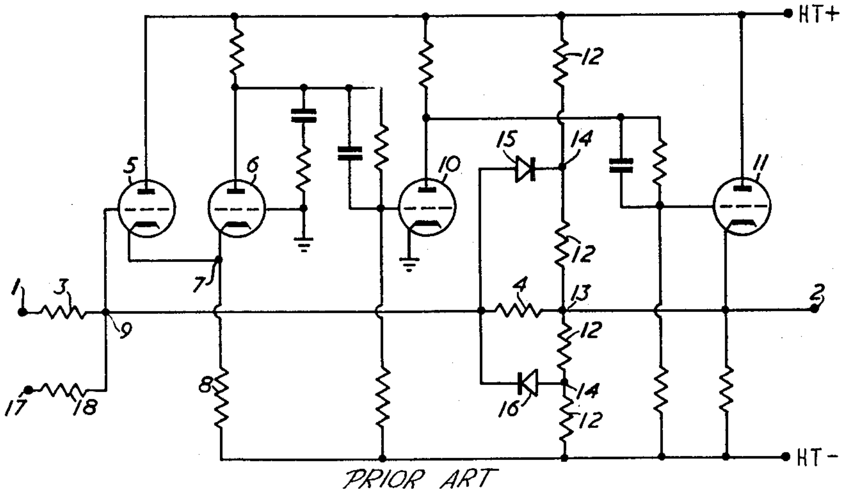
PRIOR ART FIG. 1.
Figure 2:
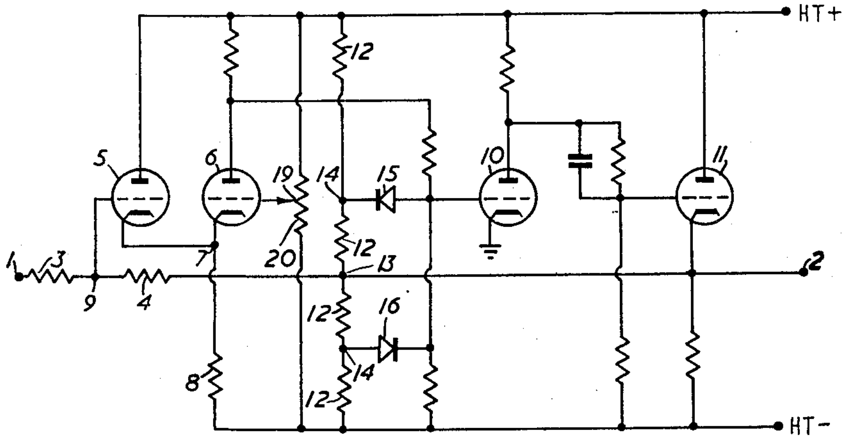

The invention is illustrated in and explained in connection with the accompanying diagrammatic drawings in which FIG. 1, which is provided for the purpose of explanation, shows a known amplifier arrangement, while FIG. 2 shows a preferred embodiment of this invention.

Referring to FIG. 1, this shows a known, high gain, amplitude limited amplifier arrangement of the so-called "see-saw" type, that is to say of the type in which an amplifier is connected across the second of two resistances which are in series with one another between the input and output terminals of the whole arrangement, and of which the second is a feedback resistance, said amplifier receiving its input from the junction point of the two resistances (this is the so-called "see-saw point") and providing an output which is a phase reversed but otherwise substantially proportional replica of the input.

Referring to FIG. 1, input is applied at terminal 1 and output is taken off at terminal 2. Between these two terminals are two resistances 3 and 4—the so-called "see-saw resistances"— the junction point 9 between which (the "see-saw" point) is connected to the input control grid of the first stage of the amplifier proper. The second resistance 4 is commonly termed the "output see-saw resistance" and, as will be apparent, provides feedback. The first stage of the amplifier comprises two valves 5 and 6 having a a common cathode connection 7 which is taken to H.T. through a resistance 8. Input from the see-saw point 9 is taken to the grid of the valve 5 and output to the next stage is taken from the anode of the valve 6 the control grid of which is earthed. The second stage includes the valve 10 which feeds both to the output terminal 2 and to the resistance 4 via a cathode follower including the valve 11 and provided in order to give a low impedance output. A potentiometer consisting of resistances 12 in series across the high tension terminals has a point 13 connected to the output terminal 2, and points 14 symmetrically disposed on opposite sides of the point 13 are connected through oppositely poled diodes or other rectifiers 15 and 16 to the see-saw point 9. These diodes, which act as limiting diodes, are thus across the output see-saw resistance 4. D.C. potential from an adjustable potential source (not shown) is applied from terminal 17 through a resistance 18 to the grid of the valve 5.

With this arrangement the diodes 15, 16 act as limiters and by adjusting the potential applied at 17 the whole arrangement may be adjusted to amplify with high gain a selected small portion of a larger waveform applied at the terminal 1, the limiting action being obtained by reason of the fact that the diodes conduct only when the output voltage range exceeds a predetermined range. The arrangement has, however, the serious disadvantage that when the diodes conduct to produce a limiting effect the overall gain is reduced but at the same time the loop gain through the feedback provided by the output see-saw resistance is considerably increased. It is accordingly usually necessary therefore to reduce the gain of the first amplifying stage over at least part of the frequency range in order to avoid instability. This, of course, involves loss of bandwidth (as compared to that which might otherwise be obtained) when the arrangement is not operating to produce limiting action. Furthermore, since the grid of the valve 6 is connected to earth, adjustment of the D.C. setting involves the application of the adjustable D.C. setting input potential from the terminal 17 to the see-saw point 9 and this limits the feedback loop gain which can be permitted and therefore limits the achievable linearity.

The present invention seeks to provide improved amplifier arrangements suitable for use for the purpose specified and which will not have the defects of the known arrangement illustrated in FIG. 1.

According to this invention an amplifier arrangement adapted to provide high gain D.C. amplification of a desired relatively small part of a large input signal comprises two resistances between input and output terminals, an amplifier including at least two stages in cascade and having its input fed from a point between said resistances and its output feeding into said output terminal, and a pair of oppositely poled unilaterally conductive devices in circuit between the input side of a stage of said amplifier subsequent to the first stage thereof and a point on the output terminal side of the said two resistances.

Preferably the unilaterally conductive devices are in circuit between the control grid of the second stage of the amplifier and a point on the output terminal side of the said two resistances. In a preferred circuit there is a potentiometer connected between the positive and negative terminals of an anode supply source for the valves of the amplifier and each of the unilaterally conductive devices is connected between the control grid of the second stage of the amplifier and one or other of two tapping points on said potentiometer which are symmetrically disposed about a third tapping point which is provided thereon and connected to the output terminal.

Preferably the first stage of the amplifier comprises two valves with a common cathode connection, the control grid of one being fed from the aforesaid point between the two resistances, and the output to the second stage being taken from the anode of the other, and the grid of said other valve is connected to a point of adjustable potential whereby adjustment of the D.C. setting of the amplifier may be made. The point of adjustable potential may conveniently be a variable tapping point on a potentiometer resistance connected between the positive and negative terminals of an anode supply source for the valves of the amplifier.

FIG. 2 shows an embodiment of this invention. As much of the circuit of FIG. 2 is the same as in FIG. 1, much of the description already given with regard to FIG. 1 need not be repeated since like references are used for like parts in both figures.

Referring to FIG. 2, it will be seen that the most important difference between the arrangement of this figure and that of FIG. 1 is that the diodes 15 and 16 are no longer connected to the see-saw point but to the control grid of the second stage valve 10. These diodes are as before, oppositely poled, and are in circuit between the control grid of the valve 10 and the output terminal, being tapped as before to points 14 on a potentiometer resistance connected across the high tension source and having a tap 13, which is centrally between the taps 14, connected to the output terminal 2. A second important difference between the arrangement of FIGS. 1 and 2 is that in the latter figure the grid of the valve 6 need no longer be earthed. This enables the external D.C. potential source connected in FIG. 1 at the terminal 17, and the resistance 18 through which this source supplies current to the see-saw point 9, to be dispensed with and instead D.C. setting control is obtained by connecting the control grid of the valve 6 in the first stage to an adjustable tapping point 19 on a potentiometer resistance 20, which is connected across the anode potential source.

In the improved arrangement of FIG. 2 the output level is determined by the internal feedback loop through one of the resistances 12 when either diode is conducting and therefore a considerably more complete limiting action is obtained. Moreover, the first stage of the amplifier is no longer included in the circuit which controls the level of output when limiting action is taking place and therefore no reduction of gain of the first stage (below that which is permissible from other considerations) is necessary and there is no consequent reduction of bandwidth. Instability when limiting action is taking place cannot occur in the arrangement of FIG. 2 as it does in FIG. 1. In addition, due to the fact that D.C. setting control is obtained on the grid of the valve 6 instead of as in FIG. 1, a higher loop gain can be employed with consequent improvement of linearity.

I claim:

1. An amplifier arrangement for providing high gain direct current amplification of a relatively small part of a large input signal comprising two amplifier stages connected in cascade, each having input and output terminals, the output terminal of the first stage being connected to the input terminal of the second stage, a resistance connected between the second stage output terminal and the first stage input terminal to define a negative feedback circuit, a voltage source connected to each of said stages, a potential divider connected across said voltage source, an intermediate point on said potential divider being directly connected to said second stage output terminal and a pair of oppositely poled rectifier devices symmetrically connected to said potential divider on opposite sides of said second stage output terminal and each connected to said second stage input terminal, the direct connection between said potential divider and said second stage output terminal defining a direct current feedback path to control the bias on said rectifier devices.

2. An amplifier arrangement as claimed in claim 1 wherein said first stage comprises two valves having a common cathode connection, the control grid of one valve being connected to said resistance and the anode of said second valve being connected to the anode of said one valve, a source of adjustable potential, the grid of said second valve being connected to said source of adjustable potential.

References Cited in the file of this patent

UNITED STATES PATENTS

| | | |
|---|---|---|
| 2,438,518 | Piety | Mar. 30, 1948 |
| 2,551,619 | McWirter et al. | May 8, 1951 |
| 2,650,268 | Broos | Aug. 25, 1953 |
| 2,744,169 | Deming | May 1, 1956 |